W. G. PELLOW.
SAW CLAMPING DEVICE.
APPLICATION FILED MAR. 18, 1914.
1,128,897.
Patented Feb. 16, 1915.
2 SHEETS—SHEET 1.
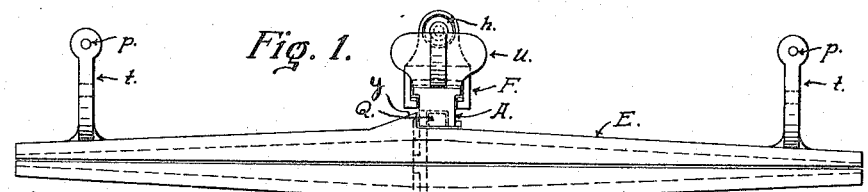
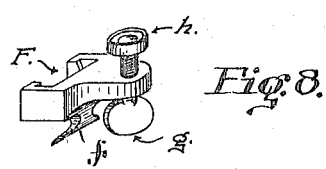
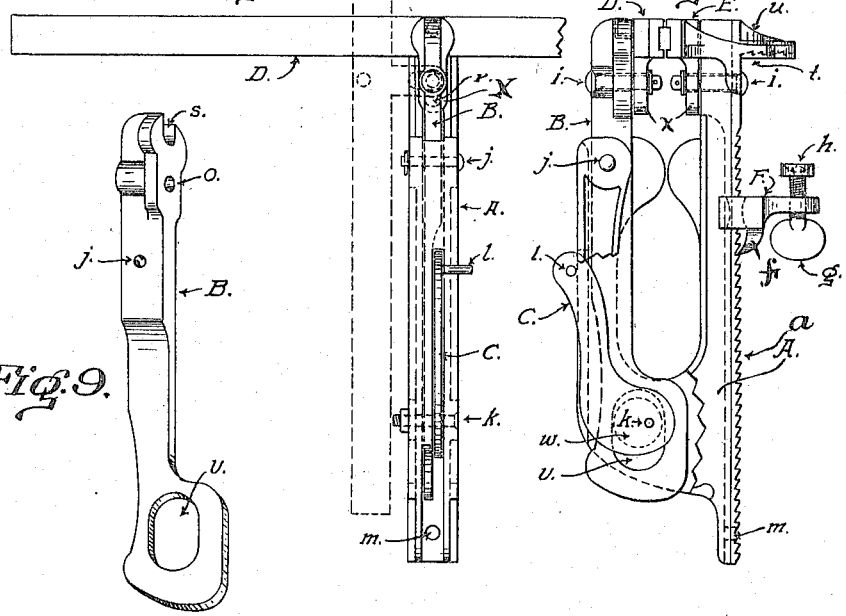
WITNESSES:
Agnes E. O'Loughlin
Nicholas C. Berbaum
William G. Pellow — INVENTOR.

W. G. PELLOW.
SAW CLAMPING DEVICE.
APPLICATION FILED MAR. 18, 1914.
1,128,897.
Patented Feb. 16, 1915.
2 SHEETS—SHEET 2.
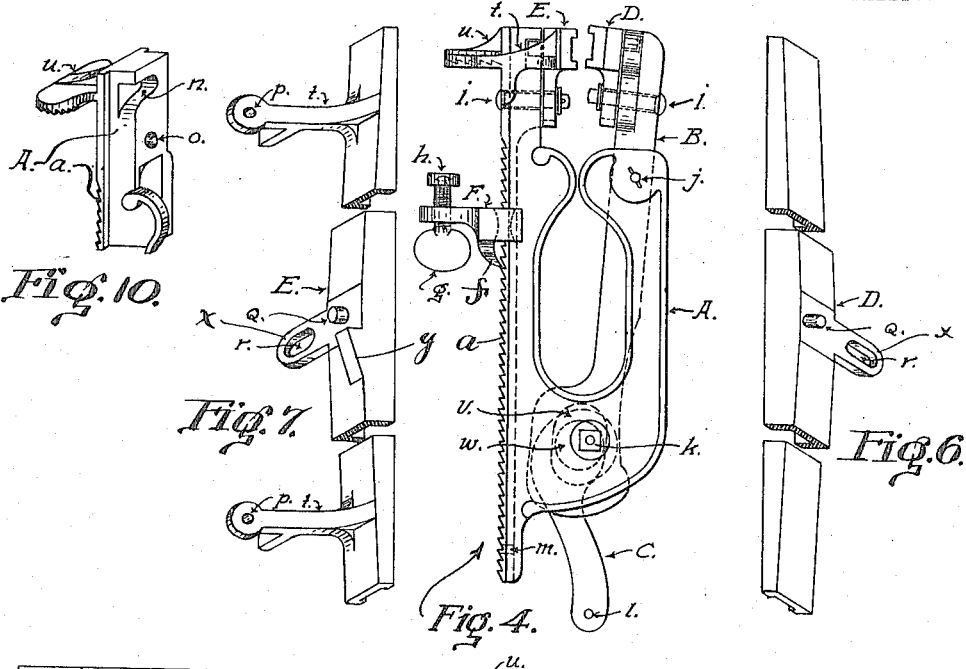
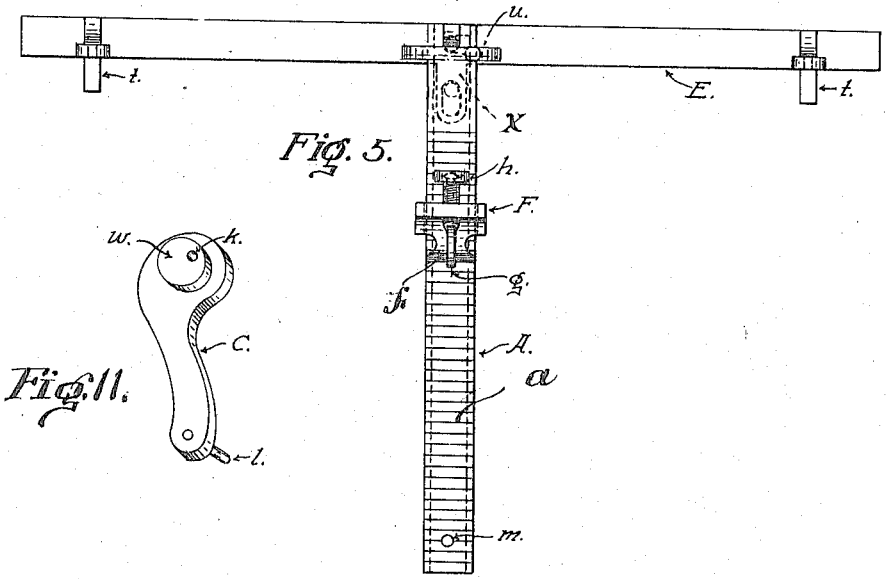

UNITED STATES PATENT OFFICE.

WILLIAM G. PELLOW, OF KANSAS CITY, MISSOURI.

SAW-CLAMPING DEVICE.

1,128,897.  Specification of Letters Patent.  Patented Feb. 16, 1915.

Application filed March 18, 1914. Serial No. 825,723.

*To all whom it may concern:*

Be it known that I, WILLIAM G. PELLOW, a citizen of the United States, residing at Kansas City, in the county of Jackson and State of Missouri, have invented certain new and useful Improvements in Saw-Clamping Devices, of which the following is a specification.

This invention relates to saw clamping devices and aims to provide an improved construction of means for retaining saws in the proper position required when filing the same. To this end the invention comprises a device having convenient means associated with one side thereof and with one of the saw clamping jaws for clamping the device to a suitable workbench; an improved mounting of the jaws whereby they may be moved relatively to the remainder of the device for folding the same into smaller compass; and a simplified construction of means for operating one of the jaw carrying members.

With these objects in view, the invention comprises certain novel and peculiar features of construction as hereinafter described and claimed; and in order to afford a full and clear understanding thereof, reference will be had to the accompanying drawings, forming a part of this specification, and in which—

Figure 1 is a top plan view of a saw clamping device embodying the present improvements; Fig. 2 is a front elevation of the same, with dotted lines representing the folded position of one of the saw clamping jaws; Fig. 3 is a side elevation of the device, partly broken away, and Fig. 4 is a similar view looking in the opposite direction and showing the open position of the saw clamping jaws; Fig. 5 is a rear elevation of the device; Figs. 6 and 7 are broken perspective views of the front and rear saw clamping jaws respectively; Fig. 8 is a perspective view of the adjustable bench-clamping member; Fig. 9 is a perspective view of the lever for carrying one of the saw clamping jaws; Fig. 10 is a fragmentary perspective view of the upper end of one of the arms of the yoke member; and Fig. 11 is a perspective view of the lever for operating the lever which carries the movable saw clamping jaw.

Referring to said drawings, the main body of the device comprises a yoke member A, the rear arm of which is provided with a fixed bench-clamping lug $u$, corrugated on its under surface (see Fig. 10) for engagement with the top surface of the edge of a work-bench or stand (not shown). For coöperating with this lug $u$ by engagement with the under surface of the edge of the work-bench there is provided a movable clamping member which comprises a sliding yoke F carrying a clamping screw $g$ provided with a swivel cap $h$, said yoke F being mounted for vertical movement along the rear arm of the member A, the rear face of which is formed with rack teeth $a$. The interior faces of the yoke F are suitably curved (see Figs. 4 and 8) to permit rocking of the yoke F vertically upon the rear arm of the member A for the purpose of lifting a tooth $f$ depending from the yoke F out of engagement with the teeth of the rack and thereby adjusting the yoke F into proper position corresponding to the thickness of the work-bench to which the device is to be applied.

The front arm of the yoke member A accommodates a lever B which is pivoted upon a pin $j$ at the upper end of said arm, and the lower end of the lever is provided with a slot $v$ into which projects an eccentric boss $w$ formed on one face of a lever C, fulcrumed by means of a pin $k$ within the base of the yoke member A. The lever C is equipped with a suitable pin $l$ for manual engagement and is so mounted with relation to the lever B that the upper end of the latter will be moved forward upon raising of the lever C, while reverse movement of lever C will swing lever B in the opposite direction for opening the saw clamping jaws (cf. Figs. 3 and 4).

The upper end of the lever B and also the upper end of the rear arm of the yoke A are each provided with a pin opening $o$ extending in a direction from front to rear for the purpose of accommodating pins $i$, which serve as means for connecting the front saw clamping jaw D and the rear saw clamping jaw E, respectively, to said lever B and said rear arm of the yoke A. Each of these clamping jaws is provided with a depending lug $x$ having a slot $r$ slidingly and pivotally engaging one of the pins $i$; and each of said jaws is also provided with a pin Q which, in the case of the clamping jaw D, is adapted to be seated in a notch $s$ formed in the upper end of the lever B whenever said jaw D is in operative or horizontal position. In the horizontal position of the rear clamping jaw E, its pin Q rides into a recess n in the upper end of the rear arm of the member A (see Fig. 10), and to coöperate with said pin Q and its recess n in limiting the swinging of jaw E into horizontal position a lug y is formed on the jaw E in position to engage the side of said rear arm adjacent its upper end. The rear saw clamping jaw is also formed near its free ends with rearwardly extending bracket arms t having angular shoulder portions as clearly illustrated in Figs. 3, 4 and 7, for the purpose of engaging the upper corner of the edge of the work-bench and thereby firmly bracing the device upon the opposite sides of the bench clamping means. In case it should be desired to secure the device more or less permanently to the work-bench, the bracket arms are provided with the openings p, and the member A with the opening m, for accommodating suitable fastening means for so attaching the device.

It will thus be apparent that a simple and efficient construction has been devised for carrying out the objects of the invention, the rear arm of the yoke A forming the main body of the device having a conveniently adjustable means for clamping the device in working position, and a simple operating means being provided for swinging the movable saw clamping jaw; while by slightly lifting the front saw clamping jaw to disengage its pin i from the notch s, it may be swung into vertical position as represented by the dotted lines in Fig. 2,—the rear saw clamping jaw requiring only to be swung laterally into such position after it has been disengaged from the edge of the work-bench. Moreover, the provision of the bracket arms t in connection with the rear clamping jaw E affords a very efficient bracing means for the device whether the same is to be applied to the work-bench either temporarily or permanently.

Claims—

1. A saw clamping device comprising a yoke member, a movable jaw carrying member mounted on one of the arms of said yoke member, the other arm of said yoke member having a rack formed thereon, a jaw pivoted to said other arm and provided with a bench-clamping portion, and a movable bench-clamping member adapted to coöperate with said bench-clamping portion of said jaw and provided with a tooth for engagement with said rack.

2. A saw clamping device comprising a yoke member, and a movable jaw carrying member mounted on one of the arms of said yoke member, the other arm of said yoke member being provided with adjustable bench-clamping means and with a jaw having bench-engaging shoulders adjacent its opposite ends for bracing said device on opposite sides of said bench-clamping means.

3. A saw clamping device comprising a yoke member, and a movable jaw carrying member mounted on one of the arms of said yoke member, the other arm of said yoke member being provided with a jaw and with adjustable bench-clamping means below said jaw, the latter being pivotally mounted upon a horizontal axis and provided with angular bench-engaging shoulders adjacent its opposite ends for bracing said device on opposite sides of said bench-clamping means.

4. In a saw clamping device, the combination of a yoke member, a lever pivoted at the upper end of one of the arms of said member and provided with a notch in its upper end and with a horizontal pivot pin below said notch, a saw clamping jaw having sliding pivotal engagement with said pin and provided with a second pin adapted to be seated in said notch, and a movably mounted saw clamping jaw carried by the other arm of said yoke member.

5. In a saw clamping device, the combination of a yoke member, a movable jaw carrying member carried by one of the arms of said yoke member, a horizontal pivot pin carried by the upper end of the other arm of said yoke member, said other arm having a laterally opening recess overlying said pin, and a saw clamping jaw having sliding pivotal engagement with said pin and provided with a second pin adapted to be seated in said recess.

6. In a saw clamping device, the combination of a yoke member, a movable jaw carrying member carried by one of the arms of said yoke member, a horizontal pivot pin carried by the upper end of the other arm of said yoke member, said other arm having a laterally opening recess overlying said pin, and a saw clamping jaw having sliding pivotal engagement with said pin, said jaw being provided with a second pin adapted to be seated in said recess and with a stop lug for engagement with said other arm to coöperate with said second pin in limiting the swinging movement of said jaw into horizontal position.

WILLIAM G. PELLOW.

Witnesses:
 AGNES E. O'LOUGHLIN,
 NICHOLAS C. BERBAUM.

Copies of this patent may be obtained for five cents each, by addressing the "Commissioner of Patents, Washington, D. C."